Figure 1:
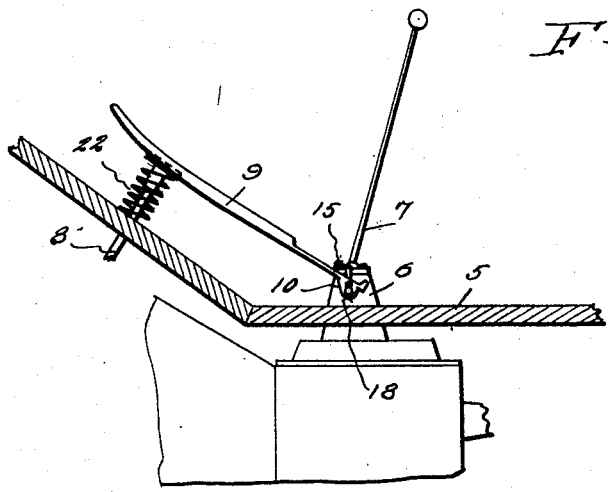

Sept. 23, 1930.  D. F. FEICK  1,776,497

FOOT PEDAL SUPPORT

Filed Oct. 26, 1928

Inventor
Dale F. Feick
By Clarence A. O'Brien
Attorney

Patented Sept. 23, 1930

1,776,497

UNITED STATES PATENT OFFICE

DALE FREDERICK FEICK, OF GARRETT, INDIANA

FOOT-PEDAL SUPPORT

Application filed October 26, 1928. Serial No. 315,229.

The present invention relates to supports for the foot pedals of motor driven vehicles and has for its principal object to provide an article of this character adapted to support the foot accelerator pedal in a convenient and comfortable position.

A further object of the invention is to provide an article of this character adapted to support the rear or heel portion of the foot accelerator pedal for pivotal movement whereby to enable the front or toe end of the pedal to be operatively connected with the gas control throttle of the vehicle.

A further object of the invention is to provide a support of this character which may be easily and quickly attached in operative position upon the vehicle without necessitating any changes or alterations in the construction thereof, which is relatively inexpensive to manufacture and otherwise well adapted for the purposes for which the same is intended.

Figure 2:
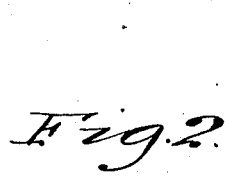
Figure 3:
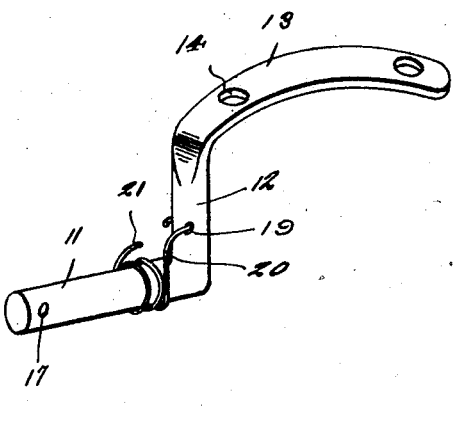

Other objects and advantages reside in the special construction, combination and arrangement of the various elements forming the invention as more fully hereinafter described and claimed, reference being had to the accompanying drawings forming part hereof, wherein like numerals refer to like parts throughout, and in which:

In the drawings:

Figure 1 is a fragmentary vertical sectional view through the floorboard of a motor driven vehicle showing the support in operative position with respect to the gas accelerator pedal, Figure 2 is a top plan view of the supporting member shown in attached position and Figure 3 is a perspective view of said support.

Referring now to the drawing in detail, wherein for the purpose of illustration I have disclosed the preferred embodiment of the invention, the numeral 5 designates the floor board of a motor driven vehicle through which the supporting housing 6 of the gear shifting lever 7 extends to a position above said floor board. The usual accelerator member 8 also extends upwardly through the floor board, which in its present instance is shown in the form of a plunger adapted for vertical actuation during the accelerating movement.

A foot pedal 9 of conventional construction is disposed with its forward or toe end portion resting upon the upper end of the accelerator plunger 8 and with the under side of its heel or rear end provided with a pair of spaced lugs 10 having an opening formed therein through which a horizontally disposed rod 11 is inserted to provide a pivotal support for the rear or heel end of the foot pedal 9.

One end of the rod 11 is bent at right angles thereto, as shown at 12 and is disposed vertically alongside of and against the housing 6 so as to be braced thereby, the upturned portion 12 of the rod terminating at its upper end in a horizontally extending attaching plate 13 which has its upper and lower faces flattened, as clearly illustrated in Figure 3 of the drawings and provided with bolt receiving openings 14 through which to insert the cover retaining bolts 15 of the case 6.

As clearly illustrated in Figure 2 of the drawing, the attaching plate 13 is arcuate shaped in order to permit the attaching of the plate by a pair of the bolts at opposite sides of the case and at the same time to permit the plate to be disposed in spaced relation from the annulus 16 of the gear shift lever.

Through the provision of the support the rear end of the foot pedal 9 is pivotally mounted slightly above the floor board 5 so that the pivotal movement of the pedal is not interfered with. The outer end of the rod 11 is formed with a transverse opening 17 through which a retaining pin 18 is inserted for retaining the foot pedal 9 in position thereon.

An opening 19 is also formed in the upright 12 of the support through which one end of a wire spring 20 is inserted, said spring having its opposite end coiled about the horizontal support 11, as clearly illustrated in Figure 3 of the drawing and with its free end 21 extended rearwardly under the rear edge of the foot pedal 9 whereby to yieldably urge the toe end of the foot pedal downwardly upon the accelerator plunger 8.

If desired, an expansion spring 22 may also be arranged about the upper end of the plunger 8 and engaging the under side of the toe of the foot pedal 9 for urging the plunger upwardly upon release of the foot therefrom and also to relieve the plunger from the weight of the foot pedal.

It will be obvious from the foregoing that the support provides a pivotal mounting for the heel end of the foot pedal whereby to provide for an accelerating movement of the pedal with a minimum amount of pressure by the foot of the operator.

It is obvious that my invention is susceptible to various changes and modifications in construction without departing from the spirit of the invention or the scope of the appended claims, and I accordingly claim all such forms of the device to which I am entitled.

Having thus described my invention, what I claim as new is:

1. As a new article of manufacture, a pedal supporting bracket comprising a portion adapted to be arranged in substantially upright position alongside of and against a housing extending above an automobile foot board so as to be braced by said housing, an attaching plate extending in one direction at right angles from one end of said portion, and a rod extending at right angles from the opposite end of said portion and in a direction opposite to that of the attaching plate and adapted for the pivotal mounting of a pedal.

2. In combination, a housing extending upwardly from the floor board of an automobile, a bracket comprising a portion arranged in substantially upright position alongside of and against said housing so as to be braced by said housing, an attaching plate extending at right angles from one end of said portion and superposed on and attached to said housing, a rod extending at right angles from said portion and spaced above said floor board, a pedal pivotally mounted at an intermediate point of its length on said rod and having a heel portion extending in rear of said rod, and a spring carried by the bracket and coiled about said rod and having an upwardly thrusting terminal portion arranged to press said heel portion of the pedal upwardly.

In testimony whereof I affix my signature.

DALE FREDERICK FEICK.